United States Patent
Fritsch et al.

(10) Patent No.: US 9,509,132 B2
(45) Date of Patent: Nov. 29, 2016

(54) SWITCHING DEVICE FOR CONTROLLING ENERGY SUPPLY OF A DOWNSTREAM ELECTRIC MOTOR

(71) Applicant: Siemens Aktiengesellschaft, Munich (DE)

(72) Inventors: Andreas Fritsch, Kummersbruck (DE); Stefan Gruber, Kummersbruck (DE); Hubert Kuhla, Hersbruck (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 14/442,128

(22) PCT Filed: Nov. 19, 2012

(86) PCT No.: PCT/EP2012/072989
§ 371 (c)(1),
(2) Date: May 12, 2015

(87) PCT Pub. No.: WO2014/075743
PCT Pub. Date: May 22, 2014

(65) Prior Publication Data
US 2015/0349518 A1    Dec. 3, 2015

(51) Int. Cl.
*H02H 3/08* (2006.01)
*H02H 7/085* (2006.01)
*H01H 9/54* (2006.01)

(52) U.S. Cl.
CPC ............. *H02H 7/085* (2013.01); *H01H 9/542* (2013.01)

(58) Field of Classification Search
CPC .......... H02J 9/062; H02J 3/1842; H02J 9/06; H02J 2009/068; H02J 3/1807; H02J 3/1814; H02J 3/386; H02J 9/00; H02J 9/04; H02J 9/061; H01H 9/542; H01H 9/541; H01H 2009/543; H01H 33/143; H01H 33/596

USPC ............. 318/432, 461, 800; 361/18, 20, 100
See application file for complete search history.

(56) References Cited

U.S. PATENT DOCUMENTS 4,100,469 A * 7/1978 Nelson ...................... H02P 1/28
318/721
4,142,136 A * 2/1979 Witter ...................... H02P 1/28
318/779

(Continued)

FOREIGN PATENT DOCUMENTS

| CN | 1237695 C | 1/2006 |
| CN | 101 005 206 A | 7/2007 |

(Continued)

OTHER PUBLICATIONS

Korean Office Action and English translation thereof dated May 23, 2016.

(Continued)

*Primary Examiner* — Paul Ip
(74) *Attorney, Agent, or Firm* — Harness, Dickey & Pierce, P.L.C.

(57) ABSTRACT

A switching device includes an energy store and a measuring device connected to a control apparatus. The energy store is connected in series between the supply connection and the power supply. The control apparatus can monitor the energy supply of the switching device in the area between the supply connection and the power supply taking place via the supply connection via the measuring device. If the energy supply monitored by the measuring device falls into a critical range, and using the energy from the energy store: the control apparatus connects the semiconductor switch in an electrically conductive manner and then opens the second switch; and subsequently switches the semiconductor switch to an electrically non-conductive state and then opens the first switch.

14 Claims, 1 Drawing Sheet

(56) References Cited

U.S. PATENT DOCUMENTS

| | | | | | |
|---|---|---|---|---|---|
| 4,305,030 | A | * | 12/1981 | Lorenz | H02P 3/26 318/371 |
| 4,392,098 | A | * | 7/1983 | Min | H02P 3/26 318/371 |
| 4,459,629 | A | * | 7/1984 | Titus | H01H 9/541 307/134 |
| 4,560,913 | A | * | 12/1985 | Min | H02P 3/24 318/759 |
| 5,519,295 | A | | 5/1996 | Jatnieks | |
| 5,650,901 | A | * | 7/1997 | Yamamoto | H01H 9/542 361/100 |
| 5,793,586 | A | * | 8/1998 | Rockot | H01H 33/596 361/8 |
| 5,815,387 | A | * | 9/1998 | Aritsuka | H02J 3/1814 361/100 |
| 6,144,191 | A | * | 11/2000 | Raedy | H02J 3/1807 323/207 |
| 6,163,129 | A | * | 12/2000 | Younger | H02P 1/26 318/798 |
| 6,586,905 | B1 | * | 7/2003 | Johnson | H02P 3/18 318/700 |
| 6,683,393 | B2 | * | 1/2004 | Lewis | H02M 5/293 307/115 |
| 6,992,872 | B2 | * | 1/2006 | Morris | H02H 11/008 324/509 |
| 7,158,393 | B2 | * | 1/2007 | Schneider | H02J 3/1842 363/34 |
| 7,193,387 | B1 | * | 3/2007 | Lu | H02P 21/0017 318/431 |
| 7,227,326 | B1 | * | 6/2007 | Lu | H02P 6/182 318/461 |
| 7,298,105 | B1 | * | 11/2007 | Lu | H02P 21/0017 318/432 |
| 7,538,507 | B2 | * | 5/2009 | Lu | H02P 6/182 318/461 |
| 8,232,679 | B2 | * | 7/2012 | Bobb | H02J 9/062 307/85 |
| 2002/0093774 | A1 | | 7/2002 | Chung | |
| 2003/0122431 | A1 | * | 7/2003 | Lewis | H02M 5/293 307/112 |
| 2004/0164617 | A1 | * | 8/2004 | Bobb | H02J 9/062 307/64 |
| 2005/0068706 | A1 | * | 3/2005 | Lewis | H02M 5/293 361/100 |
| 2006/0202636 | A1 | * | 9/2006 | Schneider | H02J 3/1842 315/291 |
| 2007/0063661 | A1 | | 3/2007 | Galli et al. | |
| 2007/0216337 | A1 | * | 9/2007 | Lu | H02P 21/0017 318/800 |
| 2007/0247099 | A1 | * | 10/2007 | Lu | H02P 6/182 318/461 |
| 2008/0225457 | A1 | | 9/2008 | Korrek | |
| 2012/0087049 | A1 | * | 4/2012 | Komatsu | H02H 7/1216 361/20 |
| 2012/0169125 | A1 | * | 7/2012 | Bobb | H02J 9/062 307/64 |
| 2013/0235492 | A1 | * | 9/2013 | Zhou | H02H 7/065 361/18 |
| 2014/0021789 | A1 | * | 1/2014 | Greer | H02J 9/06 307/64 |

FOREIGN PATENT DOCUMENTS

| | | |
|---|---|---|
| DE | 10 2006 038 209 A1 | 2/2008 |
| EP | 1 733 470 B1 | 8/2012 |
| WO | WO-2005099080 A1 | 10/2005 |
| WO | WO 2007/014725 A1 | 2/2007 |
| WO | WO-2011143087 A2 | 11/2011 |

OTHER PUBLICATIONS

Written Opinion of the International Searching Authority PCT/ISA/237 for International Application No. PCT/ dated (May 7, 2013).

International Search Report PCT/ISA/210 for International Application No. PCT/ dated (May 7, 2013).

International Preliminary Report on Patentability for International Application No. PCT/EP2012/072989 mailed Feb. 3, 2015.

* cited by examiner

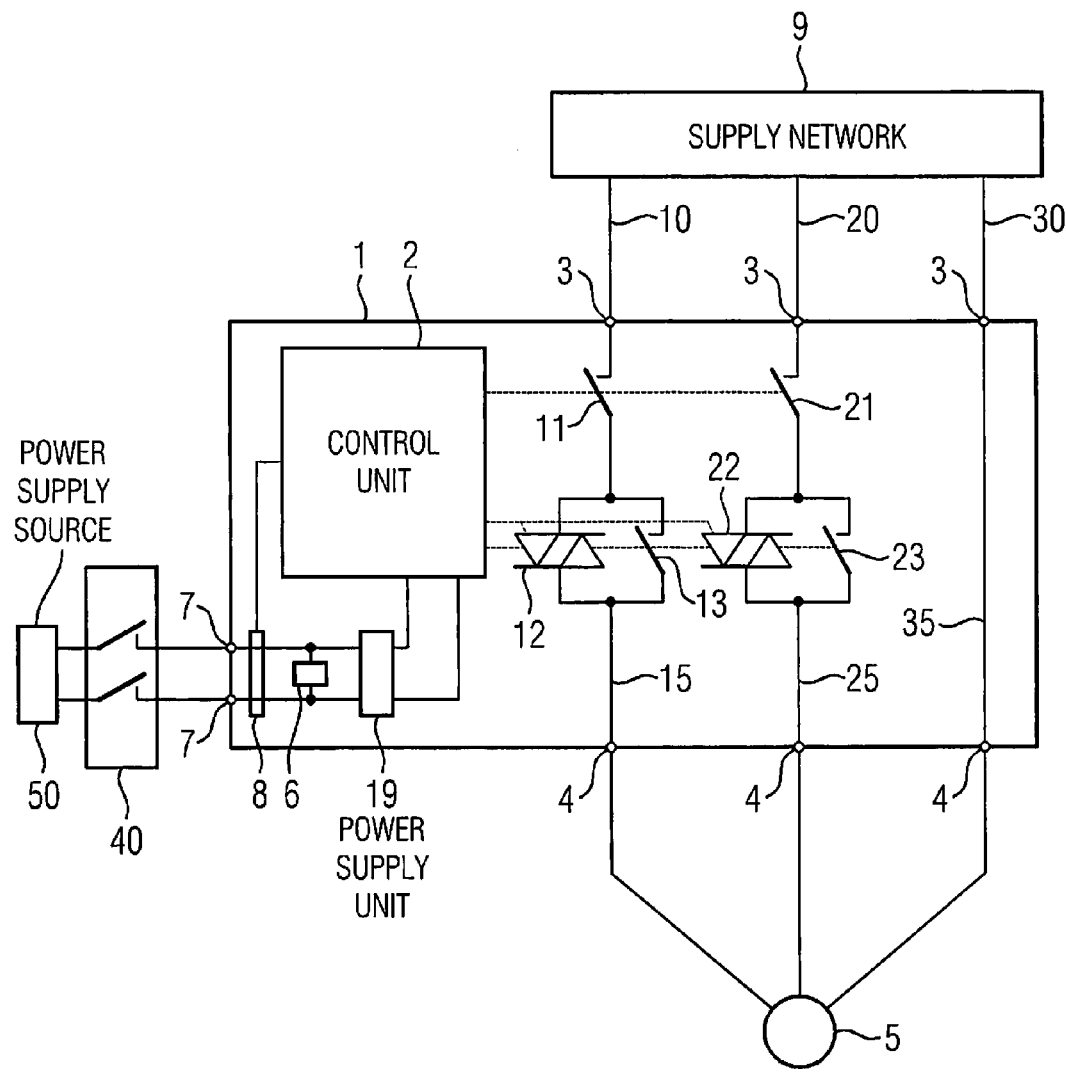

SWITCHING DEVICE FOR CONTROLLING ENERGY SUPPLY OF A DOWNSTREAM ELECTRIC MOTOR

PRIORITY STATEMENT

This application is the national phase under 35 U.S.C. §371 of PCT International Application No. PCT/EP2012/072989 which has an International filing date of Nov. 19, 2012, which designated the United States of America, the entire contents of which is hereby incorporated herein by reference.

FIELD

At least one embodiment of the invention generally relates to a switching device for controlling the energy supply of a downstream electric motor as well as a method for the switching device. The switching device according to at least one embodiment of the invention is, in particular, a motor starter and is used, in particular, within industrial automation technology. An electric motor arranged downstream of the switching device may be controlled by way of the switching device. To this end, energy supplied to the downstream electric motor of the switching device is conducted via the switching device, so that the electric motor is connected to a power supply network. The power supply network is, in particular, a low voltage network of an industrial installation (for example, three-phase, 400 volts, 50 hertz).

BACKGROUND

For controlling the energy supplied to the downstream electric motor, the switching device comprises a control unit and a first current path. Via the first current path, a first phase of the power supply network is conducted to the downstream electric motor. The first current path comprises a first electromechanical switch and a parallel circuit of a second electromechanical switch with a semiconductor switch connected in series to the first switch. The control unit may emit a switching signal for the first switch, the second switch and the semiconductor switch and thereby control the desired switching state of the switches. The first and second switches are, in particular, normally open contacts which are held in the closed switching state when a switching signal of the control unit is present. If the switching signal from the first or second switch is switched off, the switch automatically adopts the open state due to a restoring force (for example a spring force which acts on a contact of the respective switch). Such switches are, in particular, relays. The semiconductor switch preferably adopts the electrically conductive state in the presence of the switching signal of the control unit.

The switching device comprises a power supply connection via which the control unit is able to obtain the energy for the switching signals. Conventionally, a decentralized power supply source is connected by way of a conductor to the power supply connection of the switching device, so that in active operation of the switching device a supply voltage is applied via the power supply connection. The switching device obtains the energy required for the switching signals via the power supply connection. Preferably, the entire energy supply of the switching device inside the device is obtained via the power supply connection of the switching device.

The switching device is preferably used in order to switch on and switch off three-phase motors and also single-phase alternating current motors. The motors arranged downstream of the switching device are preferably also protected by the switching device against overload (short circuit protection and/or thermal overload).

If the switching device is used in applications which are critical in terms of safety, a safe disconnection of the electric motor arranged downstream of the switching device has to be ensured by the switching device.

In switching devices with emergency shutdown of the motor arranged downstream of the switching device, one possible disconnection principle is to disconnect the supply voltage of the switching device by way of a switching device (for example an emergency stop switching device) connected in series in the supply section between the power supply source and the power supply connection. Due to their mode of operation, by disconnecting the supply voltage the electromechanical switches of the switching device fall automatically into the off state (i.e. the switches are open). In this manner, when the supply voltage is switched off, the energy supply conducted to the motor via the switching device is disconnected so that the motor is safely switched off. By switching off the power supply source and automatically opening the switches, a switch-off arc is formed on the switches which causes a high degree of wear on the switches so that the number of such switching operations is generally limited in the switching devices.

SUMMARY

At least one embodiment of the invention provides an improved switching device. Preferably, by way of the switching device, a greater number of switching operations is permitted, in particular relative to a switching process due to a disconnection of the supply voltage at the power supply connection. The switching device is intended, in particular, to ensure the safe disconnection of an electric motor arranged downstream of the switching device.

At least one embodiment includes a device, i.e. a switching device comprising a control unit, a power supply connection, a power supply unit and a first current path which comprises a first electromechanical switch and a parallel circuit of a second electromechanical switch with a semiconductor switch connected in series to the first switch, wherein the control unit is able to emit a switching signal for the first switch, the second switch and the semiconductor switch, wherein the power supply connection is connected to the power supply unit and the control unit obtains via the power supply unit the energy for the switching signals, wherein the switching device comprises an energy store and a measuring device connected to the control unit, wherein the energy store is connected in series between the power supply connection and the power supply unit so that, by way of the energy store, energy supplied to the switching device via the power supply connection is buffered on the inside of the device, wherein the control unit is able to monitor by way of the measuring device the energy supplied to the switching device via the power supply connection in the region between the power supply connection and the power supply unit, wherein the control unit is configured such that if the energy supply monitored by way of the measuring device falls into a critical range, and using the energy from the energy store, said control unit in a first step switches the semiconductor switch to an electrically conductive state and then opens the second switch, and after the first step, in a second step switches the semiconductor switch to an electrically non-conductive state and then opens the first switch, At least one embodiment includes a method, i.e. by a method for a switching device which comprises a control unit, a power supply connection, a power supply unit and a first current path, wherein the first current path comprises a first electromechanical switch and a parallel circuit of a second electromechanical switch with a semiconductor switch connected in series to the first switch, wherein the control unit may emit a switching signal for the first switch, the second switch and the semiconductor switch, wherein the power supply connection is connected to the power supply unit and the control unit obtains via the power supply unit the energy for the switching signals, wherein the switching device comprises an energy store and a measuring device connected to the control unit, wherein the energy store is connected in series between the power supply connection and the power supply unit so that, by way of the energy store, the energy supplied to the switching device via the power supply connection is buffered on the inside of the device, wherein the control unit by way of the measuring device monitors the energy supplied to the switching device via the power supply connection in the region between the power supply connection and the power supply unit, wherein if the energy supply monitored by way of the measuring device falls into a critical range, and using the energy of the energy store, the control unit:

in a first step switches the semiconductor switch to an electrically conductive state and then opens the second switch, and after the first step, in a second step switches the semiconductor switch to an electrically non-conductive state and then opens the first switch.

Advantageous developments of the invention are set forth in the embodiments.

BRIEF DESCRIPTION OF THE DRAWINGS

The invention and embodiments of the invention are described in more detail and explained hereinafter with reference to the example embodiments shown in the FIGURE.

The FIGURE shows a schematic view of a system for the safe operation of an electric motor 5. The system comprises a power supply network 9, the electric motor 5, a switching device 1, a power supply source 50 and an emergency stop switching device 40.

DETAILED DESCRIPTION OF EXAMPLE EMBODIMENTS

During active operation of the electric motor arranged downstream of the switching device, the energy is supplied to the electric motor via the first current path.

In the presence of the switching signal of the control unit, the first and second switches adopt the closed switching state. If the switching signal on the first and/or second switch is switched off; i.e. no switching signal is applied to the switch, the corresponding switch automatically adopts the open switching state. In the case of a switching signal, in particular, a voltage is applied via the control circuit of the switch, in particular approx. 12 volts. In the absence of a switching signal, in particular, no voltage is applied via the control circuit of the switch.

The control unit is able to monitor by way of the measuring device the energy supplied via the power supply connection for the switching signal of the control unit. As the energy flow is monitored by way of the measuring device, in particular the voltage in the region of the electrical connection between the power supply connection and the power supply unit, preferably in the region of the electrical connection between the power supply connection and the energy store, the voltage of the power supply source fed directly to the switching device via the power supply connection may be monitored. In this manner, the control unit is able to react immediately to a voltage drop at the power supply connection.

By monitoring the energy supplied via the power supply connection by way of the measuring device, when the supply voltage falls into a critical range, which is preferably stored in the control unit or measuring device, the energy supplied to the downstream electric motor via the first current path may be disconnected in a controlled manner.

The critical range is preferably distinguished from the standard range by way of a reference value, in which a prescribed amount of energy is supplied to the switching device via the power supply connection. The reference value is thus a threshold value and/or threshold value range. The reference value is, in particular, calculated such that if the reference value is exceeded, sufficient energy is supplied to the switching device via the power supply connection, so that it is ensured that a correct switching signal is emitted by the control unit and, if the energy supply falls below a reference value, energy is supplied via the power supply connection which jeopardizes, in particular does not permit, the emission of a correct switching signal by the control unit.

The critical range is characterized, in particular, by a voltage range at the power supply connection which is below approx. 70%, preferably approx. 50% of the maximum permitted voltage to be applied to the power supply connection.

The measuring device is, in particular, a device for measuring the supply voltage applied to the power supply connection, so that by way of the measuring device the control unit may monitor the supply voltage applied via the power supply connection. The measurement by way of the measuring device takes place, in particular, in the region between the terminals of the power supply connection and the power supply unit, preferably the energy store.

The control unit itself may comprise the energy store.

Preferably, the energy supplied to the switching device on the inside of the device only takes place via the power supply connection.

Preferably, during the standard operation of the switching device, approx. 24 volts is applied to the power supply connection.

The power supply unit is a power supply unit of the switching device on the inside of the device which, in particular converts the voltage applied to the power supply connection into a different voltage.

The semiconductor switch is preferably a triac or two thyristors connected antiparallel to one another.

If a critical energy supply is detected by way of the measuring device (the energy supply via the power supply connection is in the critical range), the activation by way of the control unit takes place such that in the first step the semiconductor switch is switched to an electrically conductive state and the second switch is opened after closing the semiconductor switch. In the first step the first switch remains closed. In the second step, initially the semiconductor switch is switched to an electrically non-conductive state and then the first switch is opened. The control unit obtains the energy, which is required for emitting the required switching signals for the first and second step, from the energy store.

The energy store, which is configured in particular by at least one capacitor, is connected in series between the power supply connection and the power supply unit so that it buffers the energy supplied to the switching device via the power supply connection, on the inside of the device. The energy store is, in particular, charged up via the voltage applied to the power supply connection. If the voltage applied to the power supply connection falls into the critical range, the emission of the required switching signals for the first and second steps by the control unit is ensured by the energy buffered in the energy store. As the energy store is directly charged up by way of the voltage applied to the power supply connection, with a corresponding dimensioning of the energy store a controlled disconnection of the downstream electric motor (performing the first and second steps) is preferably able to take place at a constant voltage level. The voltage dip on the secondary side of the power supply unit preferably only takes place after the first and second steps have been performed.

The controlled disconnection of the downstream electric motor by way of the first and second steps takes place, in particular, immediately after it has been established that the voltage detected by way of the measuring device is in the critical range.

An advantage achieved by at least one embodiment of the invention is that an improved switching behavior may be achieved by a small additional hardware cost in the switching device. In particular, relative to an emergency shutdown via the power supply connection, a greater number of switching operations may be achieved for the switching device. The wear generally occurring by disconnecting the supply voltage on the switches, may be prevented by the controlled disconnection. The energy required here for the switching signal is provided by the energy store. As the energy store is arranged on the primary side of the power supply unit (the side of the power supply unit oriented toward the power supply connection), improved buffering of energy may be implemented on the inside of the device.

In an advantageous embodiment of the invention, the energy store may be charged up via the power supply connection. The energy store preferably comprises at least one capacitor which is electrically conductively connected to the power supply connection. It is also conceivable that a plurality of capacitors are used as energy stores.

In a further advantageous embodiment of the invention, the energy store is configured such that it ensures the emission of the required switching signals by way of the control unit for the first and second steps. The emission of the first and second switching signals via the control unit is thus only possible by way of the energy buffered in the energy store.

In a further advantageous embodiment of the invention, the switching device comprises a further measuring device which is connected to the control unit, wherein by way of the further measuring device the control unit is able to monitor the energy supplied via the power supply connection in the region between the power supply unit and the control unit. By way of the further measuring device, therefore, the energy supply may be monitored on the secondary side of the power supply unit.

In a further advantageous embodiment of the invention, the switching device comprises a second current path which comprises a first electromechanical switch and a parallel circuit of a second electromechanical switch with a semiconductor switch connected in series to the first switch, wherein the control unit may emit a switching signal for the first switch, the second switch and the semiconductor switch of the second current path, wherein the control unit is configured such that if the energy supply monitored by the measuring device falls into a critical range, and using the energy of the energy store, said control unit:

in a first step switches the semiconductor switch of the second current path to an electrically conductive state and then opens the second switch of the second current path, and after the first step, in a second step switches the semiconductor switch of the second current path to an electrically non-conductive state and then opens the first switch of the second current path.

The activation of the second current path by way of the control unit preferably takes place in a similar manner to that of the first current path. The second current path is preferably configured in a similar manner to the first current path.

The switching device may also comprise a third current path. The third current path may be configured in this case in a similar manner to the first or second current path. The activation of the switches of the third current path may also take place in a similar manner to that of the first current path.

In a further advantageous embodiment of the invention, the control unit is configured such that in the second step it switches the semiconductor switch in the current zero transition of the energy supplied thereby to the electrically non-conductive state. As a result, the energy supply to the electric motor is interrupted so that the first switch of the respective current path is subsequently opened without current applied. The disconnection of the energy supply to the downstream electric motor may take place, therefore, without the formation of an electric arc on the respective electromechanical switches. The wear of the switches which would otherwise occur is avoided.

In a further advantageous embodiment of the invention, a system for the safe operation of an electric motor comprises the disclosed switching device, a power supply source and a switching device, wherein the switching device is connected in series in the supply section of the power supply source to the power supply connection of the switching device such that, by an actuation of the switching device, energy supplied by the power supply source to the switching device is interrupted. The switching device is, for example, an emergency stop switching device.

The switching device 1 is connected with its three input-side terminals 3 to the power supply network 9 and with its three output-side terminals 4 to the electric motor 5. The electric motor 5 is an asynchronous motor. The power supply network 9 is a three-phase alternating current network of an industrial low voltage switching system. The switching device 1 is a motor starter 1, the energy supplied to the downstream electric motor 5 being able to be controlled thereby.

A first phase 10 of the power supply network 9 is connected by way of a conductor to the input-side terminal 3 and is conducted via a first current path 15 of the motor starter 1 on the inside of the device to the output-side terminal 4 and subsequently conducted by way of a further conductor to the electric motor 5. The first current path 15 of the motor starter 1 connects the input-side terminal 3 of the motor starter on the inside of the device to the output-side terminal 4 of the motor starter 1. The first current path comprises a first electromechanical switch 11, a semiconductor switch 12, in this case a triac, and a second electromechanical switch 13. The first switch 11 is connected in series to the parallel circuit of the semiconductor switch 12 with the second switch 13. As a result, the first phase 10 of the power supply network 9 is conducted to the electric motor 5 via the first current path 15.

A second phase 20 of the power supply network 9 is connected by way of a conductor to the input-side terminal 3 and is conducted via a second current path 25 of the motor starter 1 on the inside of the device to the output-side terminal 4 and subsequently conducted by way of a further conductor to the electric motor 5. The second current path 25 of the motor starter 1 connects on the inside of the device the input-side terminal 3 of the motor starter 1 to the output-side terminal 4 of the motor starter 1. The second current path 25 comprises a first electromechanical switch 21, a semiconductor switch 22, in this case a triac, and a second electromechanical switch 23. The first switch 21 is connected in series to the parallel circuit of the semiconductor switch 22 with the second switch 23. As a result, the second phase 20 of the power supply network 9 is conducted to the electric motor 5 via the second current path 25.

A third phase 30 of the power supply network 9 is connected by way of a conductor to the input-side terminal 3 and is conducted via a third current path 35 of the motor starter 1 on the inside of the device to the output-side terminal 4 and subsequently conducted by way of a further conductor to the electric motor 5. The third current path 35 of the motor starter 1 connects on the inside of the device the input-side terminal 3 of the motor starter 1 to the output-side terminal 4 of the motor starter 1. The illustrated motor starter 1 is a 2-phase controlled motor starter 1 so that the third current path forms a permanent electrical contact on the inside of the device between the input-side and output-side terminals 3, 4. However, it is also conceivable that the third current path 35 also comprises at least one switch or is configured in a similar manner to the first and/or second current path 15, 25 of the motor starter 1.

The motor starter 1 comprises a control unit 2, by which the switching position of the electromechanical switch 11, 13, 21, 23 and the semiconductor switch 12, 22 is controlled. To this end, the control unit 2 may emit switching signals to the switches 11, 12, 13, 21, 22, 23. A voltage is applied to the switch 11, 12, 13, 21, 22, 23 by way of the switching signal. The electromechanical switches 11, 13, 21, 23 are subjected to a spring force, so that they have to be activated by the switching signal for maintaining the closed position, as otherwise they automatically adopt the open switching state. In other words, as soon as the switching signal on the electromechanical switch 11, 13, 21, 23 is removed, said switch automatically adopts the open switching position. By way of the control unit 2, the respective semiconductor switch 12, 22 may be switched to an electrically conductive state and an electrically non-conductive state (locked state). In the electrically non-conductive state of the semiconductor switch 12, 22 the energy transmission is blocked via the semiconductor switch 12, 22.

The first electromechanical switches 13, 23 are normally open contacts of a first relay. The second electromechanical switches 11, 21 are normally open contacts of a second relay. However, it is also conceivable for the individual switches or only the first or second switches 11, 13, 21, 23 to be activated by way of a separate relay.

The motor starter 1 obtains the energy supply on the inside of the device via its power supply connection 7. To this end, the power supply connection 7 is connected by way of two conductors to a power supply source 50 which, for example, provides approx. 24 volts. Therefore, with an existing electrically conductive connection to the power supply source 7 a supply voltage of approx. 24 volts is applied to the power supply connection 7. By way of the electrical energy obtained via the power supply connection 7, the control unit 2 is able to emit the required switching signals to the respective switches 11, 12, 13, 21, 22, 23.

Inside the motor starter 1 the power supply connection 7 is electrically conductively connected to a power supply unit 19 of the switching device 1. The power supply unit 19 adapts the voltage of the voltage source 50 obtained via the power supply connection 7, such that the control unit 2 may obtain via the power supply unit 19 the appropriate electrical voltage for the switching signals.

The motor starter 1 further comprises an energy store 6 which is integrated in the electrically conductive connection of the power supply connection 7 to the power supply unit 19. The energy store 6 is a capacitor which is charged up via the power supply connection 7. The energy store 6 is able to buffer the supply of energy to the power supply unit 19. If the supply of energy to the switching device via the power supply source 50 fails, by way of the energy store 6 the supply of energy to the power supply unit 19 is buffered according to the capacity of the energy store 6, i.e. temporarily maintained. The capacity of the energy store 6 is designed such that a supply of energy to the power supply unit 19 is only ensured by way of the energy of the energy store 6 as long as the control unit 2 is able to perform a controlled disconnection of the downstream consumer 5 (performing the first and second steps).

A measuring device 8 of the motor starter 1 is arranged between the power supply connection 7 and the energy store 6. The control unit 2 may monitor the energy supplied to the power supply unit 19 via the power supply connection 7 by way of the measuring device 8. In this case, the voltage determined by way of the measuring device 8 is compared with a reference value stored in the switching device 1. If the determined voltage is above the reference value, sufficient energy is supplied via the power supply connection 7 to the switching device 1, which ensures a correct switching signal is emitted by the control unit 2. If the determined voltage, however, falls below the reference value, the energy supplied via the power supply connection 7 is such that it jeopardizes a correct switching signal being emitted by the control unit 2. The energy supplied via the power supply connection 7 is thus in the critical range. The threshold value formed by the reference value, relative to the monitored supply voltage, is 50% of the maximum permitted voltage to be applied to the power supply connection 7. If the result of the monitoring of the supply voltage by way of the measuring device 8 is that a voltage is applied to the power supply connection 7 which is below 50% of the maximum permitted voltage to be applied to the power supply connection 7, the energy supply is in the critical range. If such a state is detected, a controlled disconnection is immediately performed by the control unit 2 by way of the energy buffered by the energy store 6.

The emergency stop switching device 40 is arranged between the power supply source 50 and the motor starter 1 such that it is able to interrupt the energy supplied to the motor starter 1 via the two conductors. The emergency stop switching device 40 in this case comprises two respective switching elements which in each case are able to disconnected one conductor.

If a correct supply voltage is applied to the power supply connection 7, the motor starter 1 is able to produce an energy supply for the downstream electric motor 5. As a result, the supply voltage determined by way of the measuring device 8 is not in the critical range.

If an electric motor 5 is operating within its rated conditions, inside the motor starter 1 the first switches 11, 21 are closed, the semiconductor switches 12, 22 are switched to an electrically non-conductive state and the second switches 13, 23 are closed. One possible principle for disconnecting the electric motor 5 arranged downstream of the motor starter 1 is to disconnect the supply voltage of the motor starter 1 by way of the emergency stop switching device 40 connected in series in the supply section between the power supply source 50 and the power supply connection 7. To this end, the emergency stop switching device 40 is actuated so that it opens at least one of its switching elements.

If such an actuation of the emergency stop switching device 40 takes place, no voltage is applied via the power supply connection 7. The supply voltage at the power supply connection 7 thus falls into the critical range. As the control unit 2 monitors by way of the measuring device 8 the energy supplied via the power supply connection 7, such a change of state relative to the energy supplied via the power supply connection 7 is identified. The control unit 2 then automatically carries out a controlled disconnection of the downstream electric motor 5. The energy for emitting the required switching signals is ensured in this case by the energy store 6. By way of the energy buffered in the energy store 6, therefore, the power supply unit 19 and thereby the control unit 2 are also supplied with energy.

With the controlled disconnection of the downstream motor 5, in a first step the semiconductor switches 12, 22 are switched to the electrically conductive state by the control unit 2. The first switches 11, 21 continue to be activated by way of a switching signal of the control unit 2, so that they remain in the closed position. Due to the mode of operation, by switching off the switching signals on the first relay, the second switches 13, 23 fall automatically into the open state. The supply of energy to the electric motor 5, therefore, also takes place via the motor starter 1. The energy required for the switching signals to be emitted (semiconductor switches 12, 22 and first switches 11, 21) during the first step by the control unit 2 is provided by the energy store 6.

In a second step following the first step, the semiconductor switches 12, 22 are switched by the control unit 2 in the current zero transition to the electrically non-conductive state. Thus an interruption of the energy supply via the first and second current path 15, 25 takes place without the formation of an electric arc. This switching process takes place immediately after it is ensured that the second switches 13, 23 are open. As soon as the energy supply is interrupted via the semiconductor switches 12, 22, the energy supply to the downstream electric motor 5 is interrupted. After it has been ensured that the energy supply is interrupted via the semiconductor switches 12, 22, the switching signal from the second relay and thus from the first switches 11, 21 is switched off. Due to the mode of operation, by switching off the switching signal on the second relay, the first switches 11, 21 fall automatically into the open state. The first switches 11, 21 are thus opened without the application of current. The energy for the switching signals to be emitted during the second step by the control unit 2 is provided by the energy store 6.

By buffering the supply voltage in the energy store 6 to a sufficient extent and the internal monitoring of the supply voltage applied to the power supply connection 7 by way of the measuring device 8, when disconnecting the supply voltage a controlled interruption of the energy supplied to the downstream electric motor 5 may take place without it resulting in the formation of an electric arc on the switches 11, 13, 21, 23. The wear of the switching device 1 may thus be minimized.

If due to the loss or disconnection of the supply voltage, the supply voltage detected by the measuring device 8 falls below a predetermined threshold (reference value), the controlled disconnection of the electric motor 5 is immediately initiated by the control unit 2 (performing the first and second steps). The controlled disconnection preferably corresponds to the disconnection process which the switching device 1 performs during a normal disconnection process via the control unit 2 (operational disconnection of the electric motor 5 via the control input).

The buffering of the energy store 6 is designed such that sufficient energy for activating the switches 11, 12, 13, 21, 22, 23 is available until the end of the controlled disconnection process. In this manner, even with an emergency shutdown, a regular disconnection process may be performed without additionally loading the mechanical switches 11, 13, 21, 23. Thus a disconnection takes place without wear during an emergency stop, which is implemented by disconnecting the supply voltage. By way of the controlled disconnection process via semiconductor switches 12, 22 which are not subject to wear and the buffering of the supply voltage for the duration of the controlled disconnection process, a considerably longer service life of the mechanical switches 11, 13, 21, 23 and thus of the entire switching device 1 may be achieved.

Since by way of the energy store 6 the energy buffering takes place on the primary side of the power supply unit 19 (oriented toward the power supply connection 7), in the case of a voltage dip at the power supply connection 7, the secondary side of the power supply unit 19 is able to retain its voltage level until a specific time. In this manner, the disconnection may be performed permanently at a constant voltage level. The voltage dip on the secondary side preferably only takes place after the controlled disconnection sequence has been completed (first and second steps). As the energy store 6 is arranged on the primary side, in comparison with an arrangement of the energy store 6 on the secondary side of the power supply unit 19, a voltage drop at the power supply connection 7 and thus the critical range may be detected more rapidly, so that the controlled disconnection sequence may be initiated earlier. The emergency shutdown is thus initiated earlier. The reliability of the system is thereby improved.

Preferably, when entering the critical range, by way of the buffered energy of the energy store 6, a diagnostic message (for example, a message regarding the regular disconnection) is also transmitted via a communication way of the switching device 1 to an appliance unit connected to the switching device (for example a master control unit).

The invention claimed is:

1. A switching device comprising:
    a control unit;
    a power supply connection;
    a power supply unit; and
    a first current path connected to a power supply network, including a first electromechanical switch and a parallel circuit of a second electromechanical switch with a semiconductor switch connected in series to the first switch, wherein the control unit is able to emit a switching signal for the first switch, the second switch and the semiconductor switch, wherein the power supply connection is connected to the power supply unit and the control unit obtains via the power supply unit the energy for the switching signals, the switching device comprises an energy store and a measuring device connected to the control unit, wherein the energy store is connected in series between the power supply connection and the power supply unit so that, by way of the energy store, energy supplied via the power supply connection is buffered by the power supply source on the inside of the device, wherein the control unit is able to monitor by way of the measuring device the energy supplied to the switching device via the power supply connection in the region between the power supply connection and the power supply unit, wherein the control unit is configured such that if the energy supply monitored by way of the measuring device falls into a critical range, and using the energy from the energy store, and wherein said control unit is configured to
    switch the semiconductor switch to an electrically conductive state and then open the second switch; and
    subsequently switch the semiconductor switch to an electrically non-conductive state and then open the first switch.

2. The switching device of claim 1, wherein the energy store is chargeable up via the power supply connection.

3. The switching device of claim 2, wherein the energy store is configured to ensure the emission of the required switching signals for the switching and subsequent switching by the control unit.

4. The switching device of claim 2, wherein the switching device comprises a second measuring device connected to the control unit, wherein by way of the second measuring device, the control unit is able to monitor the energy supplied via the power supply connection in the region between the power supply unit and the control unit.

5. The switching device of claim 2, wherein the switching device comprises a second current path which comprises a first electromechanical switch and a parallel circuit of a second electromechanical switch with a semiconductor switch connected in series to the first switch, wherein the control unit is configured to emit a switching signal for the first switch, the second switch and the semiconductor switch of the second current path, wherein the control unit is configured such that if the energy supply monitored by way of the measuring device falls into a critical range, and using the energy of the energy store, said control unit is configured to:
    switch the semiconductor switch of the second current path to an electrically conductive state and then open the second switch of the second current path, and
    subsequently, switch the semiconductor switch of the second current path to an electrically non-conductive state and then open the first switch of the second current path.

6. The switching device of claim 2, wherein the control unit is configured to switch the semiconductor switch in the current zero transition of the energy supplied thereby to the electrically non-conductive state.

7. A system for the safe operation of an electric motor comprising:
    the switching device of claim 2; and
    a switching device, wherein the switching device is connected in series in the supply section of the power supply source to the power supply connection of the switching device such that, by an actuation of the switching device, energy supplied by the power supply source to the switching device is interrupted.

8. The switching device of claim 1, wherein the energy store is configured to ensure the emission of the required switching signals for the switching and subsequent switching by the control unit.

9. The switching device of claim 1, wherein the switching device comprises a second measuring device connected to the control unit, wherein by way of the second measuring device, the control unit is able to monitor the energy supplied via the power supply connection in the region between the power supply unit and the control unit.

10. The switching device of claim 1, wherein the switching device comprises a second current path which comprises a first electromechanical switch and a parallel circuit of a second electromechanical switch with a semiconductor switch connected in series to the first switch, wherein the control unit is configured to emit a switching signal for the first switch, the second switch and the semiconductor switch of the second current path, wherein the control unit is configured such that if the energy supply monitored by way of the measuring device falls into a critical range, and using the energy of the energy store, said control unit is configured to:
    switch the semiconductor switch of the second current path to an electrically conductive state and then open the second switch of the second current path, and
    subsequently, switch the semiconductor switch of the second current path to an electrically non-conductive state and then open the first switch of the second current path.

11. The switching device of claim 1, wherein the control unit is configured to switch the semiconductor switch in the current zero transition of the energy supplied thereby to the electrically non-conductive state.

12. A system for the safe operation of an electric motor comprising:
    the switching device of claim 1; and
    a switching device, wherein the switching device is connected in series in the supply section of the power supply source to the power supply connection of the switching device such that, by an actuation of the switching device, energy supplied by the power supply source to the switching device is interrupted.

13. A method for a switching device including a control unit, a power supply connection, a power supply unit and a first current path connected to a power supply network, wherein the first current path includes a first electromechanical switch and a parallel circuit of a second electromechanical switch with a semiconductor switch connected in series to the first switch, wherein the control unit is configured emit a switching signal for the first switch, the second switch and the semiconductor switch, wherein the power supply connection is connected to the power supply unit and the control unit obtains via the power supply unit the energy for the switching signals,
    the switching device further including an energy store and a measuring device connected to the control unit, wherein the energy store is connected in series between the power supply connection and the power supply unit so that, via the energy store, the energy supplied via the power supply connection is buffered by the power supply source on the inside of the device, wherein the control unit, via the measuring device, is configured to monitor the energy supplied to the switching device via the power supply connection in the region between the power supply connection and the power supply unit, wherein, if the energy supply monitored via the measuring device falls into a critical range, and using the energy of the energy store, the method comprising:
switching, via the control unit, the semiconductor switch to an electrically conductive state and then opening the second switch; and
subsequently switching, via the control unit, the semiconductor switch to an electrically non-conductive state and then opening the first switch.

14. The method for the switching device of claim 13, wherein the control unit in the second step switches the semiconductor switch in the current zero transition, of the energy supplied thereby, to the electrically non-conductive state.

* * * * *